United States Patent [19]

Butler et al.

[11] Patent Number: 5,233,916

[45] Date of Patent: Aug. 10, 1993

[54] APPARATUS FOR COOKING GRITS AND HOT CEREAL MIXTURES

[75] Inventors: Robert L. Butler, Box 596, Wallace, N.C. 28466; Samuel P. Kenworthy, Aberdeen, N.C.

[73] Assignee: Robert L. Butler, Wallace, N.C.

[21] Appl. No.: 912,530

[22] Filed: Jul. 13, 1992

[51] Int. Cl.$^5$ .................. A47J 43/04; B01F 7/00; B01F 7/08; B01F 15/02

[52] U.S. Cl. ..................... 99/325; 99/348; 366/149; 366/192; 366/195; 366/196

[58] Field of Search ............... 99/325, 334, 348, 331; 366/144-146, 149, 194, 192, 195, 196, 318, 77, 79; 62/342, 343

[56] References Cited

U.S. PATENT DOCUMENTS

| 896,551 | 8/1908 | Jurgens | 366/149 X |
|---|---|---|---|
| 2,005,996 | 6/1935 | Kraft | 99/348 |
| 3,064,908 | 11/1962 | Hjelte | 366/194 X |
| 3,739,711 | 6/1973 | Nieblach | 99/348 |
| 3,893,811 | 7/1975 | Good et al. | 366/149 X |
| 4,048,473 | 9/1977 | Burkhart | 99/331 X |
| 4,463,572 | 8/1984 | Brown, Jr. | 62/342 X |
| 4,653,281 | 3/1987 | Van Der Veer | 62/342 X |
| 4,702,608 | 10/1987 | Garber et al. | 366/146 |
| 4,733,607 | 3/1988 | Star et al. | 99/348 |
| 4,758,097 | 7/1988 | Iles, Sr. | 366/149 |

FOREIGN PATENT DOCUMENTS

| 1576148 | 7/1990 | U.S.S.R. | 99/348 |
| 2068248 | 8/1981 | United Kingdom | 366/149 |

Primary Examiner—Timothy F. Simone
Attorney, Agent, or Firm—Rhodes, Coats & Bennett

[57] ABSTRACT

A cooking device includes a cooking vessel, means for heating the contents of the cooking vessel, control means for controlling the temperature and viscosity of the contents of the cooking vessel, and an auger for stirring and dispensing the contents of the cooking vessel. The auger rotates in a first direction to mix the contents of the cooking vessel. When the food product is being dispensed, the auger reverses direction to push the food contents through the dispensing valve.

20 Claims, 2 Drawing Sheets

APPARATUS FOR COOKING GRITS AND HOT CEREAL MIXTURES

BACKGROUND OF THE INVENTION

The present invention relates generally to food cooking equipment and more particularly to an apparatus for cooking viscous food products such as grits, oatmeal, and other hot cereals or similar mixtures.

Cookers for cooking oatmeal, grits, and similar food products are known in the art. Such apparatuses usually include a heated vessel in which the food product is mixed with water, means for stirring or agitating the mixture, and means for dispensing the food product. One problem often encountered in these prior art devices is uneven cooking of the food product. This problem may be caused by failing to apply heat evenly to the food product, or by failing to keep the food product uniformally mixed.

In prior art devices, it is also difficult to maintain a desired viscosity. Factors contributing this problem include improper amounts of water being added, and loss of water vapor during cooking. Prior art cooking devices do not include means for monitoring the viscosity of the food mixture or for making corrections in the event that a deviation from a desired viscosity occurs.

Another problem with prior art devices is the failure to dispense properly. Improper dispensing is often encountered in devices relying solely on gravity to dispense the product. In these devices, the food mixture sometimes gets packed into around the dispensing valve. When the dispensing valve becomes clogged, the food product cannot be dispensed.

SUMMARY AND OBJECTS OF THE INVENTION

The present invention provides a cooking device for cooking grits, hot cereal mixtures, and similar foods which overcomes the aforementioned disadvantages with prior art devices. The cooking device of the present invention includes a cooking vessel for containing the food mixture, a jacket surrounding the cooking vessel containing a liquid such as water, means for heating the water contained within the jacket, and a reversible auger for stirring and dispensing the food mixture.

In use, the auger is rotated in a clockwise direction to stir or mix the contents of the cooking vessel. The auger causes the food mixture to be pushed away from the dispensing valve thereby preventing the food mixture from being packed around the valve. A limit switch or sensor senses the actuation of the dispensing valve and causes the auger to reverse direction. The reversing of the rotation of the auger causes the food product to be pushed through the dispensing valve. Thus, proper dispersing of the food mixture is assured.

The present invention also includes a sensor for sensing, either directly or indirectly, the viscosity of the food mixture. If the viscosity of the food mixture deviates from a determined set point, appropriate action is taken to correct the viscosity. For example, if the viscosity is too high, a valve can be opened to add more water to the cooking vessel. Thus, the viscosity of the food mixture can be controlled.

Based on the foregoing, it is a primary object of the present invention to provide an apparatus for cooking viscous food mixtures such as grits, oatmeal, and hot cereals.

Another object of the present invention is to provide an apparatus for cooking viscous food mixtures which includes means for controlling the viscosity of the food mixture.

Another object of the present invention is to provide an apparatus for cooking viscous food mixtures which will prevent the food mixture from being packed around the discharge valve.

Yet another object of the present invention is to provide an apparatus for cooking viscous food mixtures which includes positive displacement means to assist in dispensing of the food product.

Still another object of the present invention is to provide an apparatus for cooking viscous food mixtures which will apply heat uniformally to the mixture to prevent uneven cooking of the food product.

Another object of the present invention is to provide an apparatus for cooking viscous food mixture which can be easily disassembled for cleaning.

Other objects and advantages of the present invention will become apparent and obvious from a study of the following description and the accompanying drawings which are merely illustrative of such invention.

DETAILED DESCRIPTION OF THE INVENTION

Figure 1:
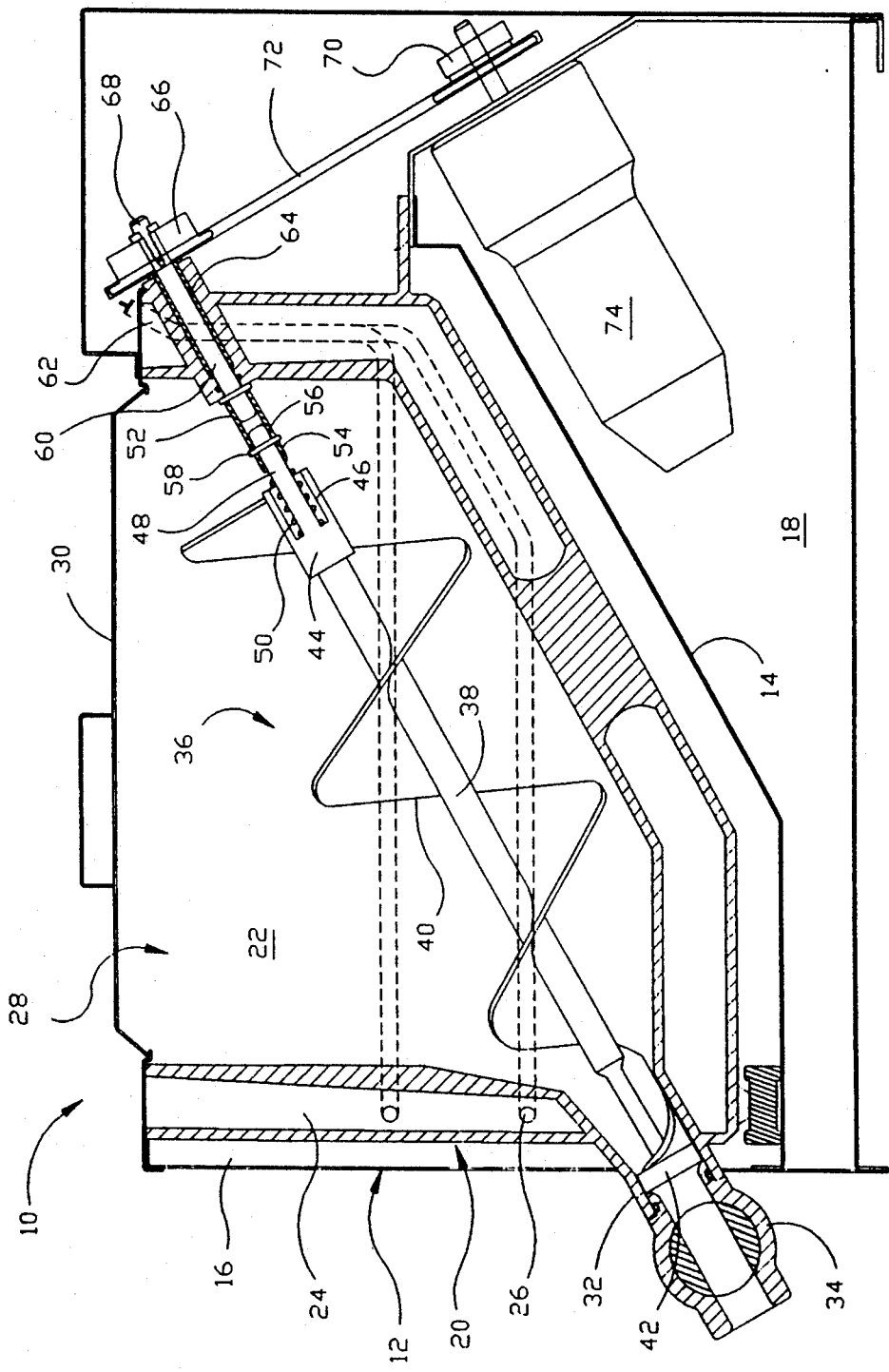
FIG. 1 is a section view of the cooking apparatus of the present invention.

Referring now to the drawings, and particularly to FIG. 1, the cooking apparatus of the present invention is shown therein and indicated generally by the numeral 10. The cooking apparatus includes a housing 12 having an interior partition 14 which divides the housing 12 into an upper compartment 16 and a lower compartment 18. The upper compartment 16 houses the cooking vessel 20 which is described in detail below. The lower compartment 18 contains the control circuitry for controlling the various components of the cooking apparatus. The walls of the upper compartment 16 are preferably insulated to prevent the walls of the housing 12 from being heated.

Mounted within the upper compartment 16 is the cooking vessel 20. The cooking vessel 20 includes an inner cooking chamber 22 which is surrounded by a water-filled jacket 24. Resistance type heating elements 26 are disposed within the water-filled jacket 24 for heating the water. The heating elements 26 are electrically connected to a suitable current source (not shown).

The cooking vessel 20 has an open top 28 through which the food product is introduced into the cooking chamber 22. A lid 30 is provided to cover the open top 28 of the cooking chamber 22 which may, if desired, be connected to the cooking vessel 20 by means of a hinge. A discharge spout 32 is formed in a lower portion of the cooking chamber 22 and extends through the water-filled jacket 24. A discharge valve 34 is connected to the discharge spout 32. In the embodiment shown, a ball-type valve is used, although the present invention is not limited thereto.

An auger 36 is disposed at an angle within the cooking chamber 22. The auger 36 includes a stainless steel shaft 38 and a helical flight structure 40 which is preferably made from a molded plastic. The auger 36 has a somewhat conical shape. That is, the flight structure 40 diminishes in size at the lower end of the auger 36. A bearing ring 22 is fixedly secured to the lower end of the auger 36. The bearing ring 42 bears against the inner surface of the discharge spout 32.

The upper end of the auger 36 is connected to a drive sprocket 66 by means of a quick disconnect fitting. The upper end of the auger shaft 38 includes an enlarged portion 44 having an annular recess 46 formed therein. A shaft extension 48 having a square cross-section extends from the annular recess 46. A spring 50 is disposed around the shaft extension 48.

The shaft extension 48 is inserted into one end of a connecting sleeve 52. The connecting sleeve has a square opening 54 for receiving the shaft extension 48. A square drive shaft 60 is inserted into the opposite end of the connecting sleeve 52. A slot 56 is formed in the wall of the connecting sleeve 52. A guide pin 58 extends through the end of the shaft extension 48 and is engaged with the slot 56 in the connecting sleeve 52.

The connecting sleeve 52 is biased by the spring 50 to a locking position as shown in FIG. 1. The connecting sleeve 52 can be moved axially downwardly on the shaft extension 48 to an unlocked position to disengage the connecting sleeve 52 from the drive shaft 60. The guide pin 58, in cooperation with the slot 56 of the connecting sleeve 52, limits the axial movement of the connecting sleeve 52 with respect to the shaft extension 48. Additionally, the pin 58 holds the connecting sleeve 52 on the shaft extension 48 when the auger 36 is disconnected.

The drive shaft 60 extends through a bearing housing 62 and is rotatably journalled within bearings 64. A drive sprocket 66 is mounted on the end of the drive shaft 60 and is secured by a bolt 68 which threads into the end of the drive shaft 60. The drive sprocket 66 is connected to a second drive sprocket 70 by a chain 72. Sprocket 70 is driven by a reversible DC motor 74 which is mounted within the lower compartment 18 of the housing 12.

Figure 2:
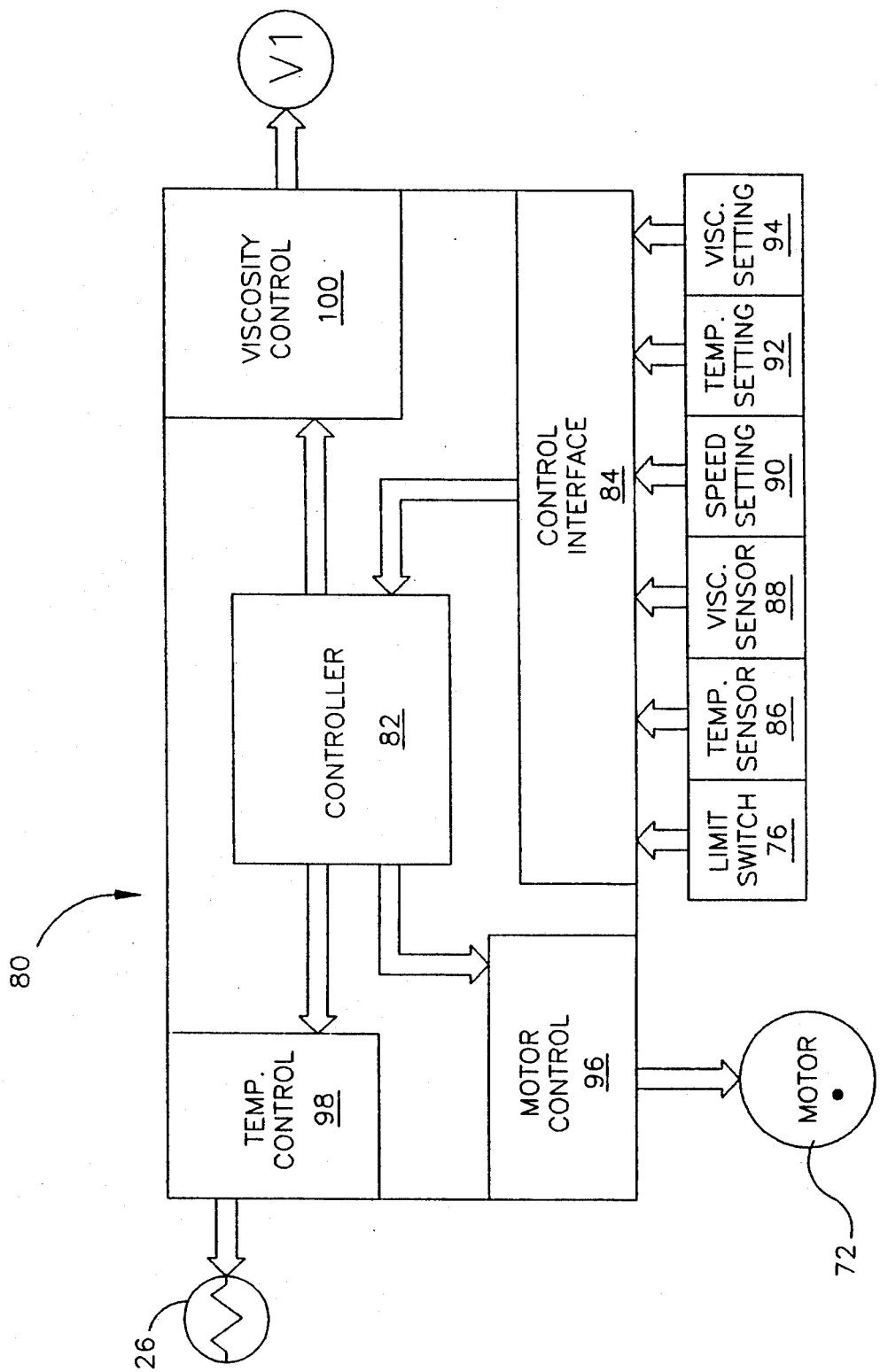
FIG. 2 is a schematic diagram showing the control system for the cooking apparatus.

Referring now to FIG. 2, a schematic diagram of the control system is shown. The control system 80 includes a controller 82 which receives input signals through the control interface 84 and outputs command signals to the appropriate control circuits 96, 98 and 100. The controller 82 receives input from a speed selector 90, a temperature selector 92 and a viscosity selector 94 through its interface 84. The selectors 90, 92 and 94 are manually set by the user. In addition, the controller 82 receives input from a temperature sensor 86 and a viscosity sensor 88.

The speed selector 90 is used to control the speed of the auger 36. The controller 82 generates a command signal which is directed to the motor control circuit 96 based on the selected speed. The motor control circuit controls the current supplied to the motor 74 to control the speed of the motor 74. Additionally, a limit switch or sensor 76 detects when the dispensing valve 34 is opened and causes the motor 74 to reverse direction to actively assist in the dispersing of the food product.

The temperature of the cooking vessel 22 is controlled based on the temperature setting input by the user through the temperature selector 92. The actual temperature sensed by the temperature sensor 86 is compared with the desired temperature. Temperature control circuit 98 will increase the current to the heating element 26 if the sensed temperature is below the desired temperature, and will reduce the current flowing to the heating element 26 if the sensed temperature exceeds the desired temperature.

The viscosity control circuit 100 operates in a similar manner to the temperature control circuit 98. The user selects a desired viscosity setting through the viscosity selector 94. The controller 82 compares the desired viscosity with the actual viscosity as indicated by the viscosity sensor 88. If the actual viscosity is higher than the desired viscosity, the viscosity control circuit 100 causes a valve V1 to be opened to add more water to the cooking vessel 20.

In use, the auger 36 will rotate in a first direction to mix the contents of the cooking vessel 20. The direction of rotation should move the food product away from the dispensing valve to prevent the food product from packing into the dispensing valve 34. The control circuit 80 will automatically control the temperature and viscosity of the food product without any intervention from the user. When the dispensing valve 34 is opened to dispense the food product, this condition is sensed by a limit switch or sensor 76 and causes the auger to reverse direction. When the auger reverses direction, the food product is pushed towards the dispensing valve. The positive displacement of the contents of the cooking chamber 22 assures proper dispensing of the food product.

Based on the foregoing, it is apparent that the present invention provides a cooking apparatus which is capable of cooking grits, hot cereal mixtures and other viscous food products. The cooking apparatus of the present invention is particularly suited for use in commercial restaurants where large quantities of mixture are prepared and served, but may also be used in the home. The cooking apparatus of the present invention maintains the food at a desired temperature and consistency, can be easily disassembled for cleaning, and will prevent the food product from being clogged in the dispensing valve. The cooking apparatus also may have certain industrial applications, such as cooking slurries slush and dry mixtures.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An apparatus for cooking grits, oatmeal, and similar food products comprising:
   (a) a cooking vessel for containing the food product;
   (b) a liquid filled jacket surrounding the cooking vessel;
   (c) means for heating the liquid contained within the jacket to provide heat for cooking the contents of the cooking vessel;
   (d) means for stirring the contents of the cooking vessel;
   (e) control means for controlling the viscosity of the contents of the cooking vessel, the control means including:
      (1) a viscosity sensor for sensing the actual viscosity of the contents of the cooking vessel,
      (2) means for comparing the actual viscosity with a predetermined viscosity, (3) means for correcting any deviations in the actual viscosity from the predetermined viscosity; and (f) means for dispensing the contents of the cooking vessel.

2. The apparatus of claim 1 further including control means for controlling the temperature of the cooking vessel.

3. The apparatus of claim 2 wherein the temperature control means includes a temperature sensor for sensing the actual temperature of the cooking vessel; means for comparing the actual temperature with a predetermined temperature; and means for correcting any deviations in the actual temperature from the predetermined temperature.

4. The apparatus of claim 1 wherein the stirring means comprises an auger disposed within the cooking vessel.

5. The apparatus according to claim 4 further including means for varying the speed of the auger.

6. The apparatus of claim 4 wherein the dispensing means comprises a dispensing valve, and means responsive to the dispensing valve for reversing the rotation of the auger to dispense the contents of the cooking vessel.

7. An apparatus for cooking grits, oatmeal, and similar food products comprising:

(a) a cooking vessel for containing the food products;

(b) means for heating the cooking vessel to cook the contents of the cooking vessel;

(c) an auger rotatively mounted within the cooking vessel, said auger being rotatable in a first direction to stir the contents of a cooking vessel;

(d) drive means for rotating the auger; and (e) a dispensing valve for dispensing the contents of the cooking vessel, said drive means being responsive to the dispensing valve for reversing the direction of the rotation of the auger to dispense the contents of a cooking vessel.

8. The apparatus of claim 7 further including means for controlling the viscosity of the contents of the cooking vessel.

9. The apparatus of claim 7 wherein the control means includes a viscosity sensor for sensing the actual viscosity of the contents of the cooking vessel; means for comparing the actual viscosity with a predetermined viscosity; and means for correcting any deviations in the actual viscosity from the predetermined viscosity.

10. The apparatus of claim 7 further including control means for controlling the temperature of the cooking vessel.

11. The apparatus of claim 10 wherein the temperature control means includes a temperature sensor for sensing the actual temperature of the cooking vessel; means for comparing the actual temperature with a predetermined temperature; and means for correcting any deviations in the actual temperature from the predetermined temperature.

12. The apparatus of claim 7 wherein the stirring means comprises an auger disposed within the cooking vessel.

13. The apparatus according to claim 7 further including means for varying the speed of the auger.

14. The apparatus of claim 7 further including a quick connect means for removing the auger from the cooking vessel.

15. An apparatus for cooking viscous mixtures comprising:

(a) a cooking vessel for containing the food product;

(b) a liquid filled jacket surrounding the cooking vessel;

(c) means for heating the liquid contained within the jacket to provide heat for cooking the contents of the cooking vessel;

(d) means for stirring the contents of the cooking vessel;

(e) control means for controlling the viscosity of the contents of the cooking vessel, the control means including:

(1) a viscosity sensor for sensing the actual viscosity of the contents of the cooking vessel, (2) means for comparing the actual viscosity with a predetermined viscosity, (3) and means for correcting any deviations in the actual viscosity from the predetermined viscosity; and (f) means for dispensing the contents of the cooking vessel.

16. The apparatus of claim 15 further including control means for controlling the temperature of the cooking vessel.

17. The apparatus of claim 16 wherein the temperature control means includes a temperature sensor for sensing the actual temperature of the cooking vessel; means for comparing the actual temperature with a predetermined temperature; and means for correcting any deviations in the actual temperature from the predetermined temperature.

18. The apparatus of claim 15 wherein the stirring means comprises an auger disposed within the cooking vessel.

19. The apparatus according to claim 18 further including means for varying the speed of the auger.

20. The apparatus of claim 18 wherein the dispensing means comprises a dispensing valve, and means responsive to the dispensing valve for reversing the rotation of the auger to dispense the contents of the cooking vessel.

* * * * *